(12) United States Patent
Dar

(10) Patent No.: US 7,113,626 B1
(45) Date of Patent: Sep. 26, 2006

(54) AUTOMATED UV RECOAT INSPECTION SYSTEM AND METHOD

(75) Inventor: Iqbal M. Dar, Odenton, MD (US)

(73) Assignee: CIENA Corporation, Linthicum, MD (US)

( * ) Notice: Subject to any disclaimer, the term of this patent is extended or adjusted under 35 U.S.C. 154(b) by 0 days.

(21) Appl. No.: 09/550,651

(22) Filed: Apr. 17, 2000

(51) Int. Cl.
*G06K 9/00* (2006.01)

(52) U.S. Cl. .................................. 382/141

(58) Field of Classification Search ............... 382/141; 356/71, 73.1; 385/140, 97, 98, 99, 71; 427/163.2; 264/1.24, 1.25; 359/341.1; 348/131, 36, 348/207.99
See application file for complete search history.

(56) References Cited

U.S. PATENT DOCUMENTS

| | | | | |
|---|---|---|---|---|
| 4,139,306 A | * | 2/1979 | Norton ..................... 348/131 |
| 4,557,556 A | * | 12/1985 | Decker, Jr. ................. 385/140 |
| 4,924,087 A | * | 5/1990 | Bailey et al. ............... 356/73.1 |
| 5,179,419 A | * | 1/1993 | Palmquist et al. .......... 356/73.1 |
| 6,002,430 A | * | 12/1999 | McCall et al. ............ 348/207.99 |
| 6,122,936 A | * | 9/2000 | Csipkes et al. ............... 65/485 |
| 6,356,296 B1 | * | 3/2002 | Driscoll et al. ............... 348/36 |

\* cited by examiner

*Primary Examiner*—Vikkram Bali
(74) *Attorney, Agent, or Firm*—Dougherty Clements; Christopher L. Bernard; Tyler S. Brown

(57) ABSTRACT

A camera system and automated translation system allows automatic image capture of a recoat of a fiber which has undergone a number of processes. These images may be used to automatically inspect the recoat of the fiber in accordance with objective criteria. A stability index may be determined based on the thickness of the recoat on the fiber, a uniformity of the recoat on the fiber, a depth of any surface cracks on the recoat, and a depth of any bubbles in the recoat. A desired stability index may be determined in accordance with a desired lifetime of the fiber and an intended use of the fiber.

18 Claims, 2 Drawing Sheets

AUTOMATED UV RECOAT INSPECTION SYSTEM AND METHOD

BACKGROUND OF THE INVENTION

1. Field of the Invention

The present invention is directed to inspecting a fiber which has under gone a series of processing steps, including UV recoating. More particularly, the present invention is directed to an automatic inspection of a fiber at the end of the processing thereof.

2. Description of Related Art

Optical fibers are very light, very fragile, and have very small dimensions. During their initial manufacture, there are practical limitations on the lengths of optical fibers that can be drawn. Therefore, the connections between the fibers to create longer designated lengths of fiber are accomplished by splicing. In addition, optical fibers or optical devices must be connected to pieces of terminal equipment, such as optical transmitters and optical receivers, to create functioning optical systems.

Direct fiber-to-fiber splicing can be accomplished using mechanical splicing devices or by fusing the glass fiber ends together by means of a flame or electric arc. The nature of the fibers themselves, both in the material used in their fabrication and in the minute physical dimensions involved, as well as submicron alignment requirements, make fiber splicing more difficult than conventional metallic conductor splicing. Problems with efficient transfer of energy, minimized optical reflections, and mechanical integrity must be addressed when splicing optical fibers. The complexities of interconnecting the fibers demands careful attention to connector design and a high level of precision in fiber splices.

For example, present day optical fiber splicing operations require numerous steps, including stripping, cleaning, cleaving, aligning, splicing, recoating and pull-testing. While each of the individual steps can be performed somewhat quickly, the set-up, preparation and transfer time between the steps of the splicing process consumes a significant amount of time. For instance, the total time for the fusion splicing process is approximately one-half of the total for an optical transmission equipment manufacturing process.

These processes may be performed manually, or may be automated, as described in commonly assigned, co-pending U.S. patent application Ser. No. 09/048,331 filed Mar. 26, 1998 entitled "Apparatus for Integrating Steps of a Process for Interconnecting Optical Fibers", which is hereby incorporated by reference in its entirety for all purposes.

The ultraviolet (UV) RECOAT is typically the last step of the interconnecting processes. Thus, it is after this step that it is most desirable to verify the quality of the fiber. The fiber quality becomes more important as many applications are trying to pack fibers into smaller spaces. The tighter bend radius required places greater stresses on the fiber. Currently, a user evaluates the interconnected fiber by viewing the fiber, typically through a microscope, rotating the fiber, and making a decision as to the quality of the fiber in accordance with the visual inspection.

SUMMARY OF THE INVENTION

The present invention is therefore directed to system and method of inspecting a fiber after recoat which substantially overcomes one or more of the problems due to the limitations and disadvantages of the related art.

It is an object of the present invention to provide an index for determining the stability of an interconnected fiber. It is further an object of the present invention to automate such determination. It is yet another object of the present invention to provide a system for quick, controlled data gathering for use in inspecting a fiber.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which:

FIG. 2b is a cross-section of a fiber being inspected, indicating the field of view of each camera in FIG. 2a;

FIG. 3b is perspective bottom side view of the base plate of FIG. 3a;

DETAILED DESCRIPTION OF THE PREFERRED EMBODIMENTS

Figure 1:
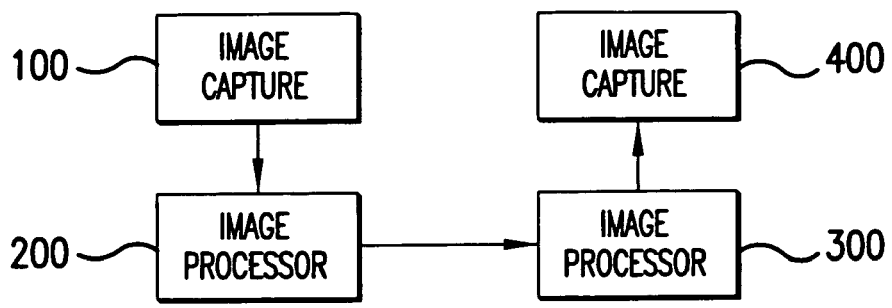
FIG. 1 is a block diagram of the system of the present invention.

The present invention will be described in detail through preferred embodiments with reference to accompanying drawings. However, the present invention is not limited to the following embodiments but may be implemented in various types. The preferred embodiments are only provided to make the disclosure of the invention complete and make one having an ordinary skill in the art know the scope of the invention. The thicknesses of various layers and regions are emphasized for clarity in accompanying drawings. Throughout the drawings, the same reference numerals denote the same elements.

A block diagram of the inspection system of the present invention is shown in FIG. 1. An image capture unit 100 takes an image of the fiber to be inspected. This image is sent to an image processor 200, e.g., a microprocessor or central processing unit. The image processor 200 extracts any imperfections from the images, analyzes the features of these imperfections, and compares these features to established pass/fail criteria. The supervisory controller 300, discussed above, controls the movement of the fiber to be inspected in and out of the inspection station. The supervisory controller 300 also controls the motion controller 400 which moves the cameras and fiber to be inspected relative to one another at controlled intervals. The motion controller 400 moves the fiber to be inspected to a starting point to establish a homing position and then moves the fiber relative to the cameras along the length thereof to a finish point.

Vision System

The vision system for inspecting the UV recoat generally includes a camera and an autofocus unit. In the particular configuration shown in FIG. 2a, the vision system has two cameras, a top camera 102 mounted above a fiber 112 to be inspected and a bottom camera 104 mounted below the fiber 112 to be inspected. The fiber 112 is held by a metrology frame, the details of which are set forth in commonly assigned, co-pending U.S. patent application Ser. No. 09/048,331 filed Mar. 26, 1998 entitled "Apparatus for Integrating Steps for a Process for Interconnecting Optical Fibers", which issued as U.S. Pat. No. 6,122,936 on Sep. 26, 2000, which is hereby incorporated by reference in its entirety for all purposes. An autofocus unit 108 automatically adjusts the focus of each camera after the fiber has been translated. The top camera 102 is preferably mounted horizontally and a prism 106 or other redirecting element provides the image from the top of the fiber 112 to be inspected to the top camera 102. The bottom camera 104 is preferably mounted vertically and captures the image of the bottom of the fiber to be inspected. There is preferably a hole 110 in a base plate 114 which receives the metrology unit holding the fiber to be inspected for allowing the image of the bottom of the fiber 112 to be inspected to pass to the bottom camera 104.

Figure 2A:
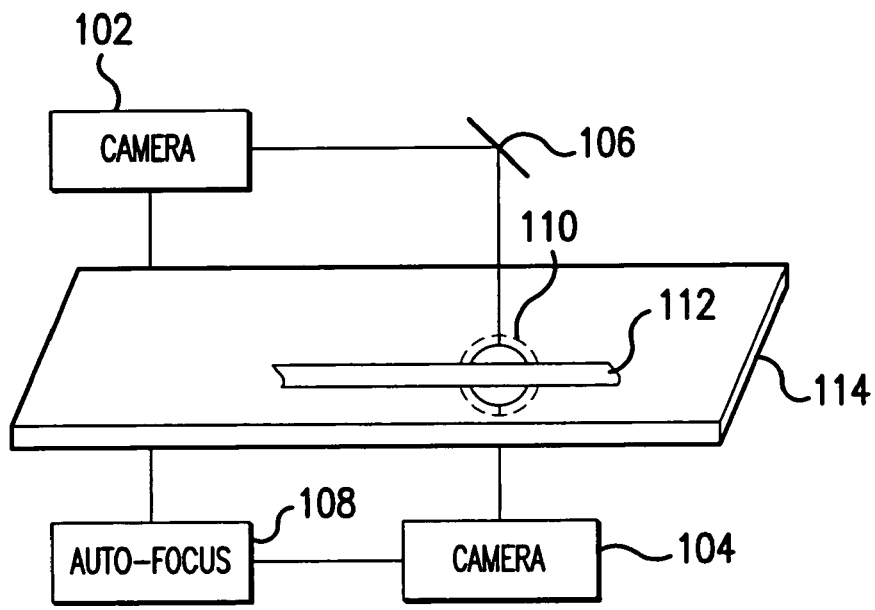
FIG. 2a is a schematic view of vision the system of the present invention.
Figure 2B:
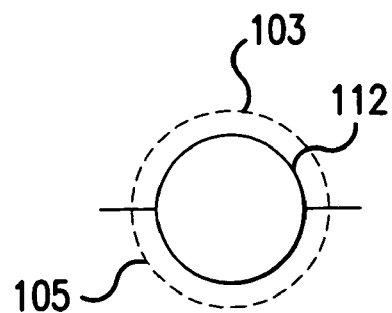

The images of the fiber captured by the respective cameras are shown in FIG. 2b, in which a cross-section of the fiber 112 is shown. The top camera 102 captures an image of a top semicircle 103 of the fiber 112 and the bottom camera 104 captures an image of a bottom semicircle 105 of the fiber 112. Any configuration of cameras which allows the entire image of the fiber to be captured in an automated fashion may be used, including a single camera with the fiber rotating, which would no longer require a hole in the base plate, or a single camera receiving alternate images of the top semicircle and the bottom semicircle.

Mechanical Automation Features

Figure 3A:
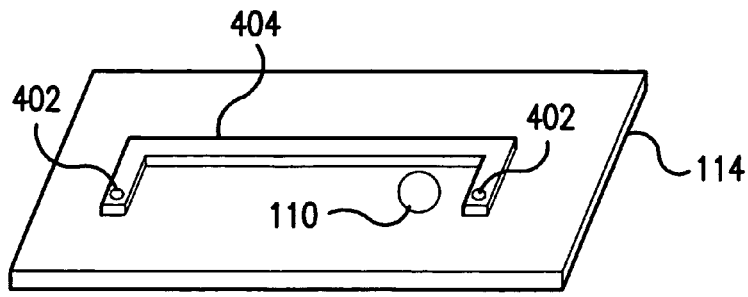
FIG. 3a is a top perspective view of a base plate of the present invention.

In addition to the elements shown in FIG. 2a, a top of the base plate 114 also includes a base frame 404, as shown in FIG. 3a, The base frame 404 holds the metrology frame housing the fiber in a static position parallel to a work surface without any vibration as the base frame 404 moves the fiber for inspection from start to end. As can be seen in FIG. 3a, the base frame also includes alignment pins 402 for receiving the metrology frame housing the fiber.

Figure 3B:
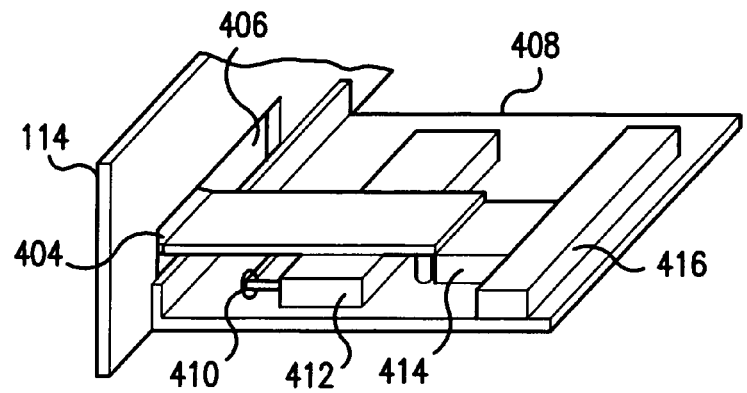

As can be seen from the elevational perspective view in FIG. 3b, a bottom of the base plate 114 includes a system for moving the base frame, and thus the fiber, relative to the camera(s). The base frame 404 extends through a slot 406 in the base plate 114 and is attached to a linear slide 410 on a linear motor 412. The linear motor 412 is preferably magnetically controlled for efficient small linear movements. The actual size of the movement of the linear motor 412 is determined in accordance with a desired level of detail of the inspection. The alignment pins 402 on the base frame 404 and the slot 406 in the base plate 114 ensure that the same starting point for inspection is used for each fiber. For extra quality control, an encoder slide 414 may be used with an encoder 416 to optically compare slide movements generated by the linear slide 410 with location marks on the encoder 416.

All the components on the bottom of the base plate 114 are preferably provided on an interface plate 408. The interface plate 408 preferably very rigid to prevent the force from the loaded metrology frame from transferring to the encoder 416. Force on the encoder will cause the encoder 416 to fail.

Objective Inspection Criteria

Figure 4A:
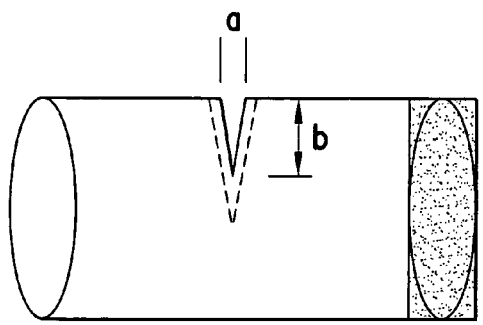
FIG. 4a illustrates stress concentration of a bubble inside a fiber.
Figure 4B:
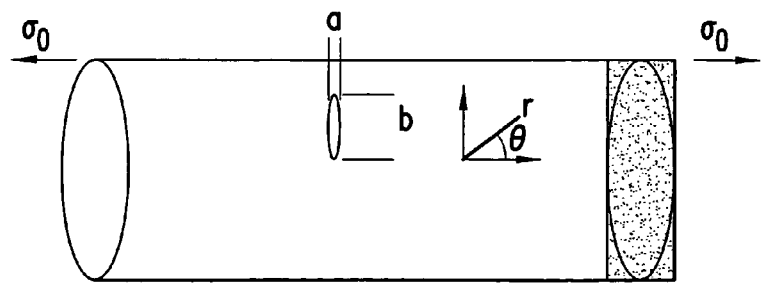
FIG. 4b illustrates stress concentration of a surface crack on a fiber.

Once the data has been gathered for a fiber being tested, the image processor or microprocessor 200 analyzes the images to determine the size and type of any flaws on the coating. These flaws are generally either crack on the surface of the recoat, shown in FIG. 4a or imperfections in the recoat itself, called a bubble, shown in FIG. 4b. As can be seen in both these figures, the size of each imperfections is characterized by two dimensions, a width Aa@ and a depth Ab@. Generally, the maximum stress which can be withstood by the fiber is given by $\sigma_0(1+2*(b/a))$. The deeper the crack, the higher the stress acting on the tip of the crack. The speed of the growth of the crack increases with increasing depth.

The surface defects are more critical than the internal defects. Wherever the fiber is unprotected, small surface defects easily occur and grow rapidly. This growth may be accelerated by exposure to water, which react chemically with the fiber. The thickness and the uniformity of the recoat also effect the lifetime of the fiber. Presence of a bubble and/or surface defect will decrease the apparent thickness and/or uniformity of the recoat. The overall stability of the fiber may be determined by the following:

$$s_i = w_1 exp(n_1 t) + w_2 exp(n_2 s) + w_3 exp[-n_3 s] + w_4 exp[-n_4 B] \quad (1)$$

where t is the thickness of the recoat, u is the uniformity of the recoat, s are the depth of the surface discontinuities, and B is the size of the bubbles, $n_1$–$n_4$ are experimentally determined parameters based on fiber type and its intended use, and $w_1$–$w_4$ are weights assigned to each factor in accordance with a desired end use. The weights $w_1$–$W_4$ are related by:

$$w_1 + w_2 + w_3 + w_4 = 1 \quad (2)$$

The larger the stability index (si), the longer the fiber lifetime.

The desired stability index may be objectively set based on the desired end use and required lifetime. The bend diameter to which the fiber is to be subjected typically establishes the maximum stress of the fiber. The microprocessor performs an automated pass/fail comparison of bubbles and cracks in the UV recoat to the established criteria based on the required lifetime and intended use. If the fiber fails, it may then be returned to the UV recoat stage to be recoated again and then reinspected.

Thus, in accordance with the present invention, images of the UV recoat may be automatically captured, and, from these images, the fiber may be inspected to determine its stability index. This stability index may then be compared to a desired stability index, and the fiber will pass if its stability index is greater than or equal to the desired stability index and fail if its stability index is less than the desired stability index.

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation. Thus, the scope of the invention should be determined by the appended claims and their legal equivalents, rather than by the examples given.

What is claimed is:

1. A system for inspecting an optical fiber comprising:
a camera system imaging an entire circumferential surface of the optical fiber by imaging partial portions of the entire circumferential surface and then recombining the partial portions into a complete image of the entire circumferential surface;
an automated motion system which translates the optical fiber relative to the camera from a start point to an end point; and
an image processor operatively connected to said camera system, said image processor evaluating the optical fiber images from said camera system for imperfections and calculating a stability index based on a thickness of the recoat on the fiber, a depth of any surface cracks on the recoat, and a depth of any bubbles in the recoat.

2. The system of claim 1, further comprising an autofocus unit for automatically adjusting a focus of the camera system each time the optical fiber is linearly translated.

3. The system of claim 1, wherein the camera system comprises two cameras, each camera imaging a different semicircle of the optical fiber.

4. The system of claim 1, wherein said camera system includes a top camera which captures a top semicircle of the fiber, a bottom camera which captures a bottom semicircle of the fiber, and a reflector which redirects an image of one of the top and bottom semicircle to a corresponding top and bottom camera.

5. The system of claim 1, wherein said automated motion system comprises a base frame holding the fiber and a linear motor attached to the base frame.

6. The system of claim 5, further comprising a base plate, the base frame being mounted on one side of the base plate, the linear motor being mounted on an opposite side of the base plate, and the base frame extending through the base plate.

7. The system of claim 6, further comprising a calibrated slot in the base plate through which the base frame extends, the calibrated slot establishing a start and finish position for the translation of the optical fiber.

8. The system of claim 5, wherein the base frame includes alignment pins for aligning the optical fiber with the base plate.

9. The system of claim 1, further comprising an encoder which checks operation of the automated motion system.

10. The system of claim 1, wherein the automated motion system comprises a magnetic coil linear motor.

11. A method for inspecting an optical fiber having a recoat thereon comprising:
imaging the optical fiber;
evaluating at least one image of the optical fiber for imperfections; and
calculating a stability index based on a thickness of the recoat on the fiber, a depth of any surface cracks on the recoat, and a depth of any bubbles in the recoat.

12. The method of claim 11, wherein said imaging includes automatically translating the fiber relative to a camera system.

13. The method of claim 12, wherein said automatically translating includes aligning a fiber with a frame attached to a motor.

14. The method of claim 12, wherein said automatically translating includes positioning the fiber at a homing position.

15. The method of claim 12, wherein said automatically translating includes comparing translations to translation of an encoder slide.

16. The method of claim 11, wherein said imaging of the fiber includes imaging a top surface and a bottom surface of the fiber simultaneously.

17. The method of claim 11, further comprising, when the recoat is determined to be unacceptable, directing the fiber back to be recoated again.

18. The method of claim 11, further comprising:
determining acceptability of the recoat of the optical fiber by comparing the stability index to an objective criteria.

* * * * *